(12) United States Patent
Hori et al.

(10) Patent No.: US 6,244,531 B1
(45) Date of Patent: Jun. 12, 2001

(54) CLUTCH MECHANISM AND WEBBING WINDING DEVICE

(75) Inventors: Seiji Hori; Tomonori Nagata, both of Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 09/261,959

(22) Filed: Mar. 3, 1999

(30) Foreign Application Priority Data

Mar. 4, 1998 (JP) .................................. 10-052413

(51) Int. Cl.[7] .......................... B60R 22/46; F16D 41/064
(52) U.S. Cl. ............................................. 242/374; 192/38
(58) Field of Search ........................ 242/374; 280/806; 192/38, 44, 45, 54.52

(56) References Cited

U.S. PATENT DOCUMENTS

| 360,393 | * | 3/1887 | Rogers ................................... 192/45 |
| 4,750,685 | * | 6/1988 | Frei ........................................ 242/374 |
| 5,451,008 | | 9/1995 | Hamaue ................................. 242/374 |
| 5,489,072 | * | 2/1996 | Gordon et al. ........................ 242/374 |
| 5,743,480 | * | 4/1998 | Kopetzky et al. .................... 242/374 |
| 5,794,875 | * | 8/1998 | Schmid ................................. 242/374 |
| 5,794,876 | * | 8/1998 | Morizane et al. .................... 242/374 |

FOREIGN PATENT DOCUMENTS

| 0 313 098 A1 | 4/1989 | (EP) . |
| 0 940 603 A2 | 9/1999 | (EP) . |
| 1 146 683 | 11/1957 | (FR) . |

OTHER PUBLICATIONS

European Search Report.

* cited by examiner

Primary Examiner—John M. Jillions
(74) Attorney, Agent, or Firm—Nixon Peabody LLP; Thomas W. Cole

(57) ABSTRACT

In a normal state, a roller is engaged with an engaging projection of a rotor constituting a pretensioner and is not nipped between the rotor and a shaft. Accordingly, the shaft is freely rotated and a spool is also freely rotated so that a webbing can be pulled out and wound up. When a vehicle suddenly decelerates, the rotor is rotated and the engaging projection is separated from the roller. Accordingly, the roller is pushed by a taper of the rotor and is nipped between an outer circumferential face of the shaft and the taper. Since the rotor and the shaft are connected to each other through the roller, the rotation force of the rotor is transmitted to the shaft and the spool is rotated and the webbing is wound. Accordingly, it is possible to provide a webbing winding device in which the rotation force of the pretensioner can be transmitted to the spool without causing resistance in the rotation of the pretensioner at its operating time or wasting the rotation force for rotating the spool.

10 Claims, 19 Drawing Sheets

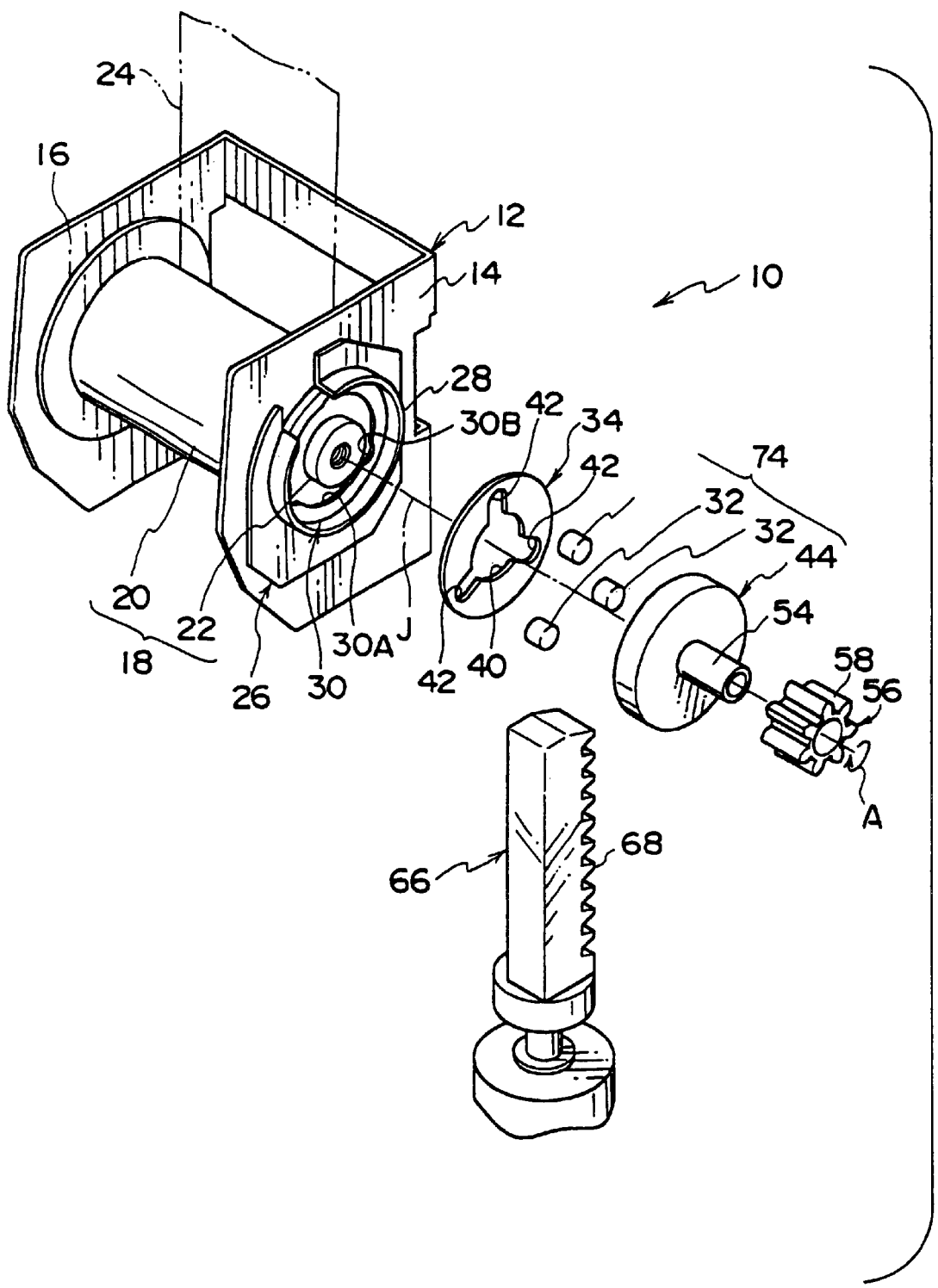
F I G. 1

F I G. 3
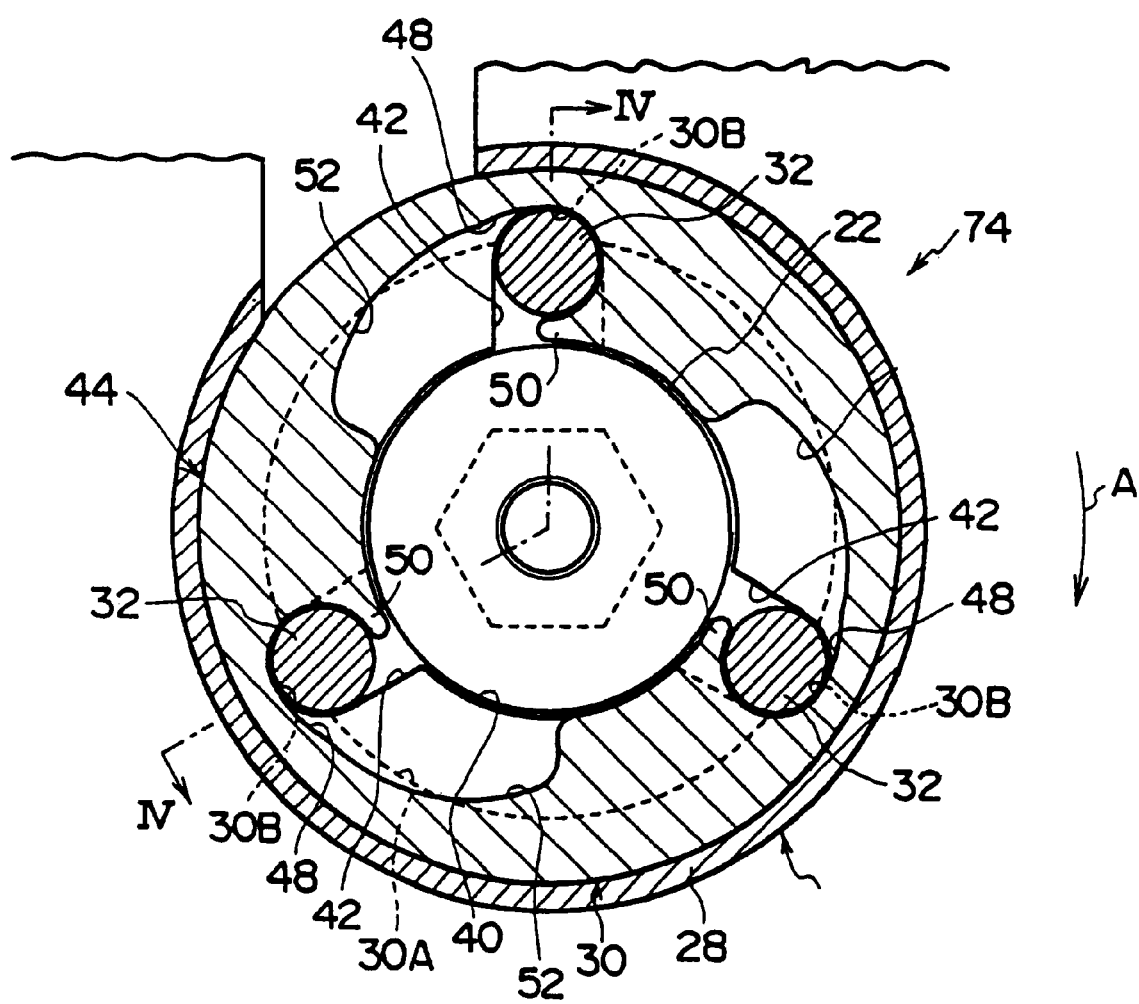

F I G. 5
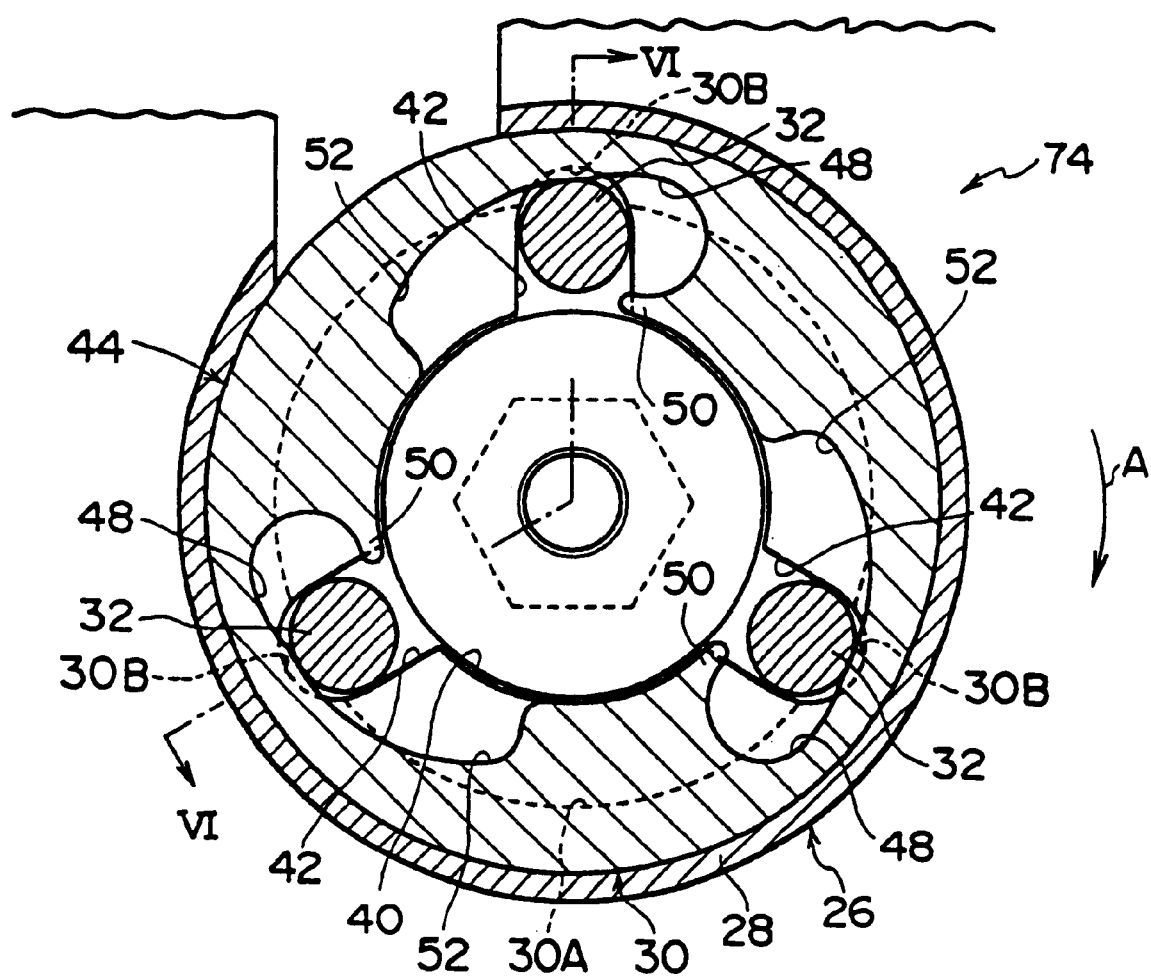

F I G. 7
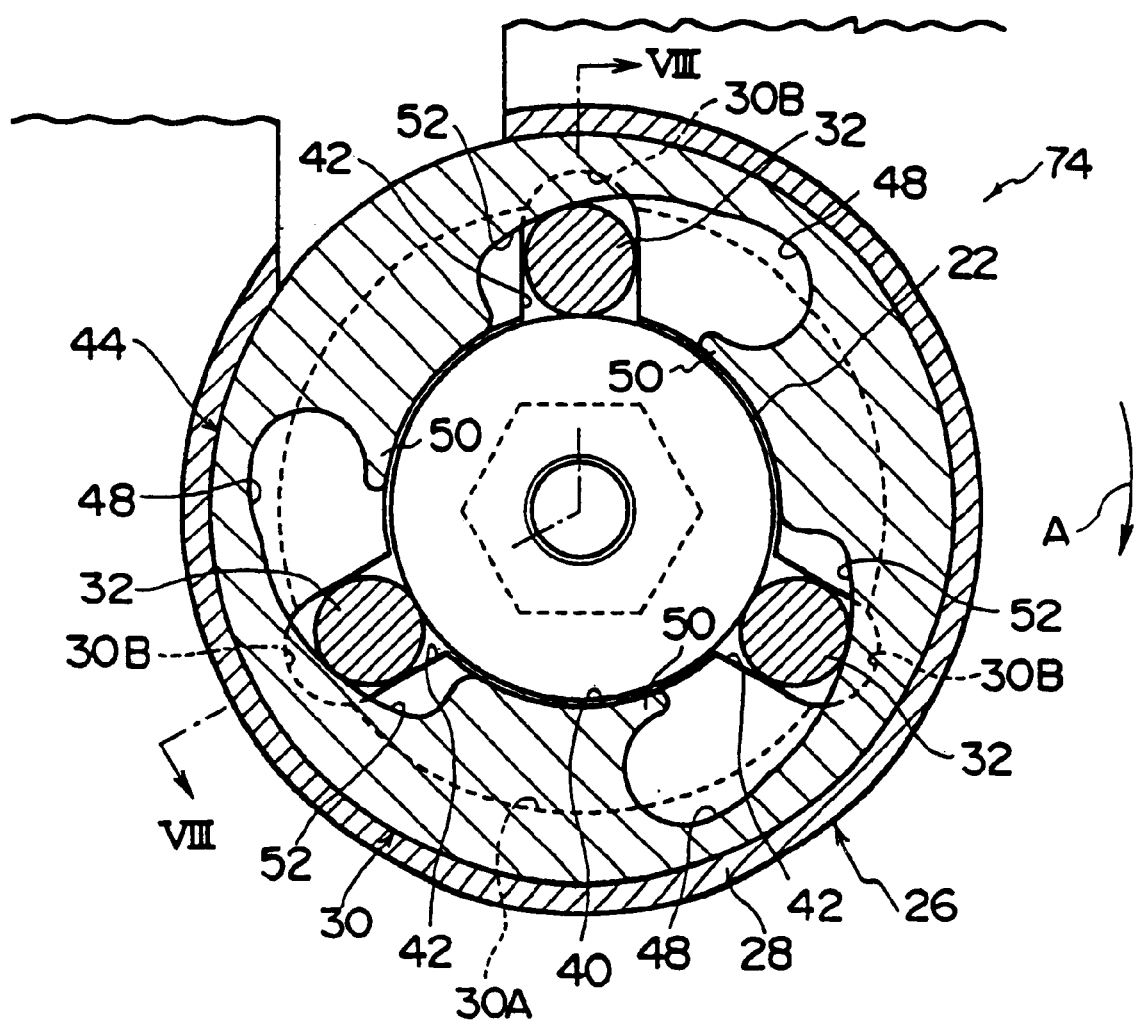

F I G. 1 6
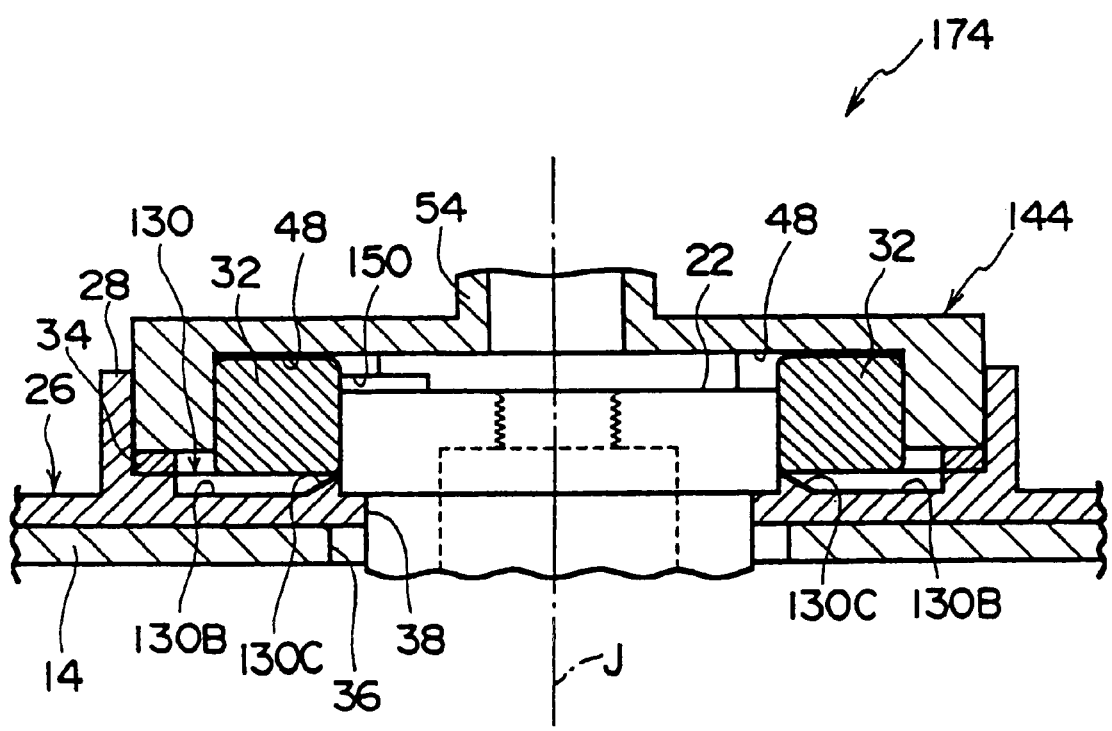

CLUTCH MECHANISM AND WEBBING WINDING DEVICE

BACKGROUND OF THE INVENTION

1. Field of the Invention

The present invention relates to a clutch mechanism and a webbing winding device, for example, a webbing winding device having a pretensioner for rotating a spool in a webbing winding direction at a time when a vehicle suddenly decelerates, and a clutch mechanism used in this webbing winding device.

2. Description of the Related Art

A conventional webbing winding device 310 is shown in FIGS. 17 and 18.

In this webbing winding device 310 (see Japanese Patent Application Publication (JP-B) No. 2-10743), rolling bodies 320 are mounted in supporting pins 314 projecting from a cover 312. The rolling bodies 320 are inserted into notches 318 of a pulling member roller 316. Each rolling body 320 is normally spaced apart from an intermediate bush 324 and a belt shaft 322 is freely rotated independently of the pulling member roller 316.

When the pulling member roller 316 is rotated in the direction of arrow B when, for example, a vehicle suddenly decelerates, the supporting pins 314 are sheared by the rotating force of this pulling member roller 316, and the pulling member roller 316 and the intermediate bush 324 are connected to each other through the rolling bodies 320. Thus, the rotating force of the pulling member roller 316 is transmitted to the bel t shaft 322 and a pretensioner is operated so that slackening of the belt is removed.

Accordingly, shearing force for shearing the supporting pin 314 is required when the pretensioner is operated in this webbing winding device 310. However, this shearing force gives resistance to the rotation of the pulling member roller 316 and the torque for rotating the belt shaft 322 is reduced as a result.

In contrast to this, in a webbing winding device 350 (see Japanese Patent Application Laid-Open (JP-A) No. 8-133015) shown in FIG. 19, a sliding portion 354 is connected to base plate portion 352 by a thin, breakable connecting portion 356. Further, a roller pin holding portion 358 is disposed perpendicularly to the sliding portion 354. No roller pin 360 held by the roller pin holding portion 358 comes in contact with a sleeve 362 at a normal time. Accordingly, the possibility of the roller pins 360 influencing the pulling-out, winding, or the like of the webbing 364 is low.

When a large deceleration occurs in the vehicle and clutch outer teeth 366 are rotated in the direction of arrow C via a planetary gear device, the roller pins 360 bite into portions between an outer circumferential face of the sleeve 362 and cam faces 368 of the clutch outer teeth 366 due to the deformation of the roller pin holding portions 358. Thus, the clutch outer teeth 366 and the sleeve 362 are connected to each other and rotating torque of the clutch outer teeth 366 is transmitted to the sleeve 362 so that the pretensioner is operated. Further, when the clutch outer teeth 366 are rotated, the rotating drive force of the clutch outer teeth 366 are transmitted to a holder 370 through the roller pin 360 and the connecting portion 356 is broken. Accordingly, the clutch outer teeth 366 further rotate the sleeve 362 in the direction of the arrow C via the roller pin 360 so that a winding shaft 372 is rotated and the webbing 364 is tightened.

Accordingly, the connecting portion 356 is also broken when the pretensioner in this webbing winding device 350 is operated and this breaking gives resistance to the rotation of the clutch outer teeth 366 and torque for rotating the winding shaft 372 is reduced as a result.

Such a problem is not limited to the above webbing winding devices 310, 350, but is generally caused in a clutch mechanism for transmitting the rotating force of a rotating member to a member to be rotated by moving and nipping a transmitting member between the rotating member and the member to be rotated by breaking one portion of the transmitting member.

SUMMARY OF THE INVENTION

In consideration of such facts, an object of the present invention is to provide a clutch mechanism capable of transmitting the rotation force of a rotating member to a member to be rotated without causing resistance in the rotation of the rotating member or wasting the rotation force for rotating the member to be rotated, and a webbing winding device capable of transmitting the rotation force of a pretensioner to a spool without causing resistance to the rotation of the pretensioner at its operating time or wasting the rotation force for rotating the spool.

In a first aspect of the present invention, a clutch mechanism comprises: a rotating member capable of transmitting rotation force to a member to be rotated; a supporting member for rotatably supporting said member to be rotated; a transmitting member nipped between said member to be rotated and said rotating member and able to be moved between a transmitting position for transmitting the rotation force of said rotating member to the member to be rotated and a nontransmitting position spaced apart from at least one of said member to be rotated and said rotating member; holding means for holding said transmitting member in said nontransmitting position in a state in which said rotating member is not rotated with respect to said supporting member; and moving means for moving said transmitting member to said transmitting position when said rotating member is rotated with respect to said supporting member in a state in which the holding of said transmitting member using said holding means in said nontransmitting position is released.

The transmitting member can be moved between the transmitting position and the nontransmitting position. However, the transmitting member is held by the holding means in the nontransmitting position in a state in which the rotating member is not rotated with respect to the supporting member. Therefore, the member to be rotated can be freely rotated relatively with respect to the rotating member.

When the rotating member is rotated, the holding means does not hold the transmitting member in the nontransmitting position so that the transmitting member can be moved between the nontransmitting position and the transmitting position. Further, when the rotating member is rotated with respect to the supporting member, the moving means moves the transmitting member to the transmitting position. The transmitting member is nipped between the member to be rotated and the rotating member in the transmitting position so that the rotating force of the rotating member is transmitted to the member to be rotated and the member to be rotated is rotated.

Thus, the transmitting member can be move d in advance between the transmitting position and the nontransmitting position. The transmitting member is held by the holding means in the nontransmitting position in a state in which the rotating member is rotated with respect to the supporting member. When the rotating means is rotated, the holding means does not hold the transmitting member in the nontransmitting position. Since the transmitting member is not moved from the nontransmitting position to the transmitting position by breaking the transmitting member, etc., the rotation force of the rotating member can be transmitted to the member to be rotated without causing resistance in the rotation of the rotating member or wasting the rotation force for rotating the member to be rotated by breaking the transmitting member.

In a second aspect of the present invention, the clutch mechanism of the first aspect is characterized in that said holding means is constructed from at least one of either said rotating member or said supporting member, or a combination of said rotating member and said supporting member, and the transmitting member is held in the nontransmitting position by setting said transmitting member so as to be unable to be moved in at least a diametrical or axial direction of said rotating member.

Accordingly, the transmitting member can be held by a simple structure in the nontransmitting position.

In a third aspect of the present invention, a webbing winding device comprises: a spool for webbing to be wound around so as to allow the webbing to be pulled from the spool; a pretensioner capable of transmitting rotation force in a webbing winding direction to said spool when a vehicle suddenly decelerates; a casing for rotatably supporting said spool; a roller nipped between said spool and said pretensioner and able to be moved between a transmitting position for transmitting the rotation force of said pretensioner to said spool and a nontransmitting position spaced apart from at least one of said spool and said pretensioner; a holding portion for holding said roller in said nontransmitting position in a state in which said pretensioner is not rotated with respect to said casing; and a moving portion for moving said roller to said transmitting position when said pretensioner is rotated with respect to said casing in a state in which the holding of said roller using said holding portion in said nontransmitting position is released.

The roller can be moved between the transmitting position and the nontransmitting position. However, the roller is held by the holding portion in the nontransmitting position in a state in which the pretensioner is not rotated with respect to the casing. Therefore, the spool can be freely rotated relatively with respect to the pretensioner.

When the pretensioner is rotated with respect to the casing when a vehicle suddenly decelerates, the holding portion does not hold the roller in the nontransmitting position so that the roller can be moved between the nontransmitting position and the transmitting position. Further, when the pretensioner is rotated with respect to the casing, a taper moves the roller to the transmitting position. Since the roller is nipped between the spool and the pretensioner in the transmitting position, the rotation force of the pretensioner is transmitted to the spool so that the spool is rotated. Thus, the webbing is wound around the spool.

Thus, the roller can be moved in advance between the transmitting position and the nontransmitting position. The roller is held by the holding portion in the nontransmitting position in a state in which the pretensioner is not rotated with respect to the casing and when the pretensioner is rotated with respect to the casing, the holding portion does not hold the roller in the nontransmitting position. Since the roller is not moved from the nontransmitting position to the transmitting position by breaking the roller, etc., the rotation force of the pretensioner can be transmitted to the spool without causing resistance in the rotation of the pretensioner or wasting the rotation force for rotating the spool by breaking the roller, etc.

BRIEF DESCRIPTION OF THE DRAWINGS

FIG. 1 is an exploded perspective view showing a webbing winding device in accordance with a first embodiment of the present invention.

FIG. 3 is a cross-sectional view showing a clutch mechanism of the webbing winding device in accordance with the first embodiment of the present invention.

FIG. 5 is a cross-sectional view showing a state in which the engagement of a roller is released in the clutch mechanism of the webbing winding device in accordance with the first embodiment the present invention.

FIG. 7 is a cross-sectional view showing a state in which the roller is nipped between a rotor and a shaft in the clutch mechanism of the webbing winding device in accordance with the first embodiment of the present invention.

FIG. 16 is a cross-sectional view taken along line XVI—XVI of FIG. 15 and showing a state in which the roller is nipped between the rotor and the shaft in the clutch mechanism of the webbing winding device in accordance with the second embodiment of the present invention.

DESCRIPTION OF THE PREFERRED EMBODIMENTS

Figure 2:
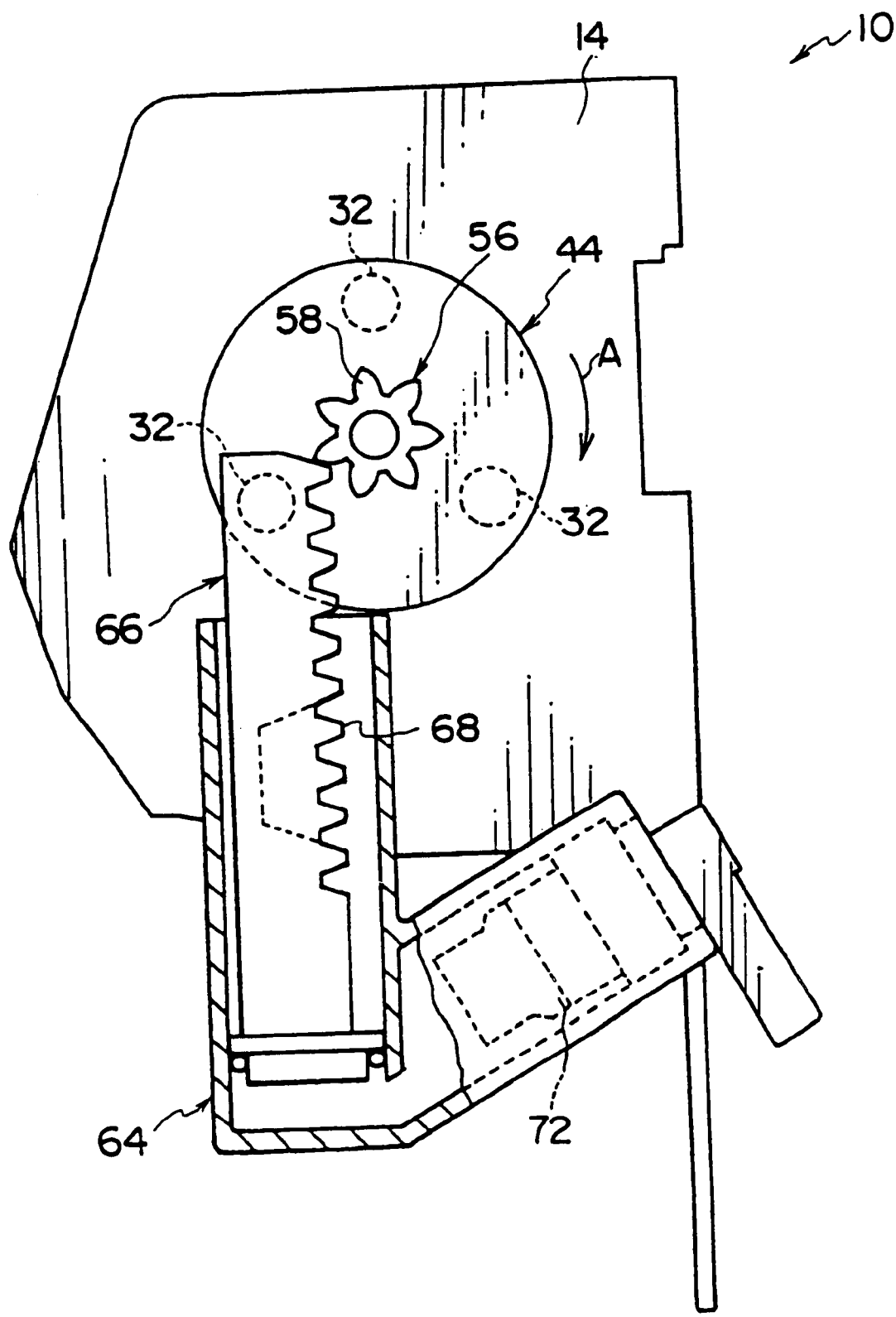
FIG. 2 is a side view showing a schematic construction of the webbing winding device in accordance with the first embodiment of the present invention when the webbing winding device is in a normal state.

FIG. 1 shows a main portion of a webbing winding device 10 employing a clutch mechanism 74 in accordance with a first embodiment of the present invention. FIGS. 3 to 8 show an operation of the clutch mechanism 74.

Thee webbing winding device 10 has a frame 12 attached to an unillustrated vehicle. A pair of supporting plates 14, 16 are arranged in parallel with each other in the frame 12. A winding sleeve body 20 molded in a substantially cylindrical shape is disposed between the supporting plates 14 and 16 and has a flange projecting from each of both axial ends of the winding sleeve body 20 towards its diametrical outer side. One end of a webbing 24 is fixed to this winding sleeve body 20 and the webbing 24 can be wound up or pulled out by rotating the winding sleeve body 20.

A shaft 22 is arranged at a center of the winding sleeve body 20 and is integrally rotated with the winding sleeve body 20. One end of the shaft 22 is inserted into insertion holes 36 and 38 (see FIG. 4 with respect to both the holes) formed respectively in the supporting plate 14 and a casing 30 described below, and projects through to an outer face side (the side opposite to the side where the winding sleeve body 20 is disposed, namely the upper side in FIG. 4) of the supporting plate 14. A spool 18 in the present invention is constructed from the winding sleeve body 20 and the shaft 22.

Figure 4:
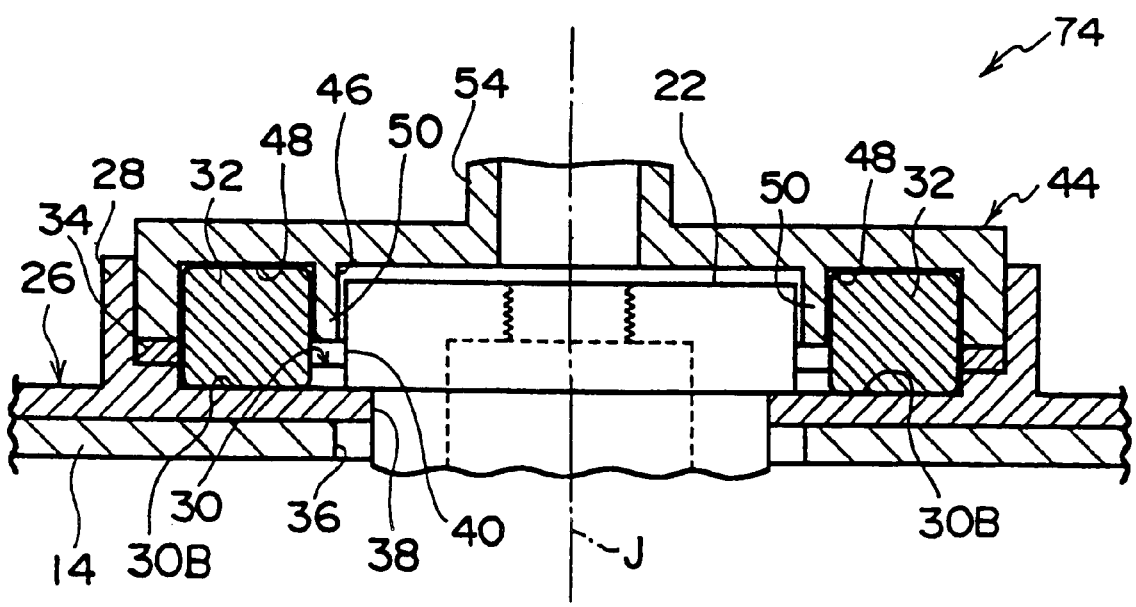
FIG. 4 is a cross-sectional view taken along line IV—IV of FIG. 3 showing the clutch mechanism of the webbing winding device in accordance with the first embodiment of the present invention.
Figure 6:
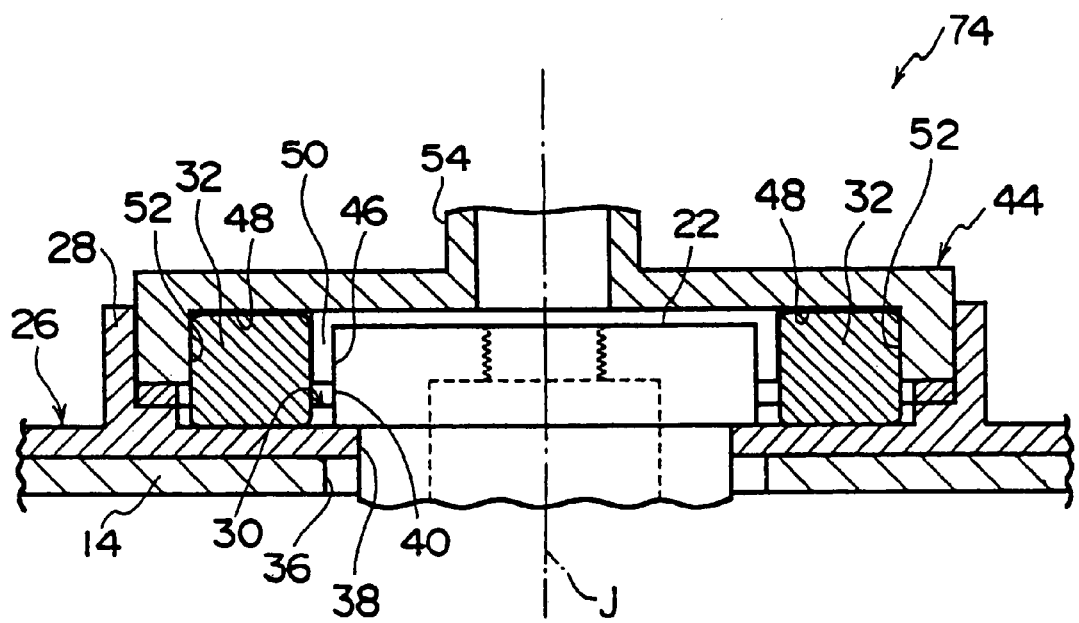
FIG. 6 is a cross-sectional view taken along line VI—VI of FIG. 5 showing a state in which the engagement of a roller is released in the clutch mechanism of the webbing winding device in accordance with the first embodiment of the present invention.

As shown in FIGS. 3 and 4, a positioning plate 26 is fixed to the outer face of the supporting plate 14. A positioning sleeve body 28 having a substantially cylindrical shape is disposed in an upright position from the positioning plate 26 and has the same axis as the shaft 22 and a diameter larger than that of the shaft 22.

The casing 30 is formed on an inner side of the positioning sleeve body 28 by forming thicker portions in the positioning plate 26. The insertion hole 38 (see FIG. 4) for inserting one end of the shaft 22 thereinto is formed at the center of the casing 30. Accordingly, the shaft 22 is rotatably supported by the casing 30.

As shown in detail in FIGS. 3 and 4, a circular moving storing portion 30A is formed around the insertion hole 38 of the casing 30. The moving storing portion 30A has a width (a diametrical width, namely, the width in a left-right direction in FIG. 4) greater than the diameter of a roller 32 described below by forming thin portions in the casing 30. As described below, the roller 32 can be revolved round a central line J within the moving storing portion 30A in a state in which the roller 32 is biting into the shaft 22 (see FIG. 8).

Further, a plurality (three in the present embodiment) of fixing storing portions 30B are formed by partially widening the moving storing portion 30A in a diametrical direction in the casing 30. (Hereinafter, "diametrical direction" designates the same direction as the diametrical direction of the shaft 22. Further, "axial direction" and "circumferential direction", respectively designate the same directions as the axial and circumferential directions of the shaft 22.) The fixing storing portions 30Bs are formed in predetermined positions such that the angles formed by lines connecting each fixed storing portion 30B and the center of rotation of the shaft 22 are uniform angles (the angles are each 120° since three fixing storing portions 30B are formed in this embodiment).

The rollers 32 formed in a columnar shape and whose axial direction is the same as the direction of the central line J are provided in the fixing storing portion 30B. The rollers 32 cannot be moved in the circumferential direction of the shaft 22 in a normal state (a state in which the deceleration of a vehicle having the webbing winding device 10 attached thereto does not reach a predetermined value).

As shown in FIG. 1, a holding plate 34 formed substantially in a disk shape is disposed on an inner side of the positioning sleeve body 28 and at one end of this positioning sleeve body 28 in the axial direction thereof from the casing 30. A circular insertion hole 40 is formed at the center of the holding plate 34. One end of the shaft 22 is inserted into the insertion hole 40. (Accordingly, the shaft 22 is inserted into the insertion holes 36, 38, and 40 formed respectively in the supporting plate 14, the casing 30, and the holding plate 34, and one end of the shaft 22 projects from the holding plate 34.)

A portion (a portion projecting from the casing 30) of the shaft 22 near one end of this shaft 22 is set to have a diameter larger than that of the insertion hole 38 so as to prevent the shaft 22 from being pulled out of the casing 30.

A plurality (three in this embodiment) of holding holes 42 are formed in the holding plate 34 by partially enlarging the diameter of the insertion holes 40 on the outer side in the diametrical direction thereof. Each of the holding holes 42 is formed in a position corresponding to the fixing storing portion 30B of the casing 30 and comes in contact with an outer circumferential face of the roller 32 stored in the fixing storing portion 30B.

A rotor 44 formed substantially in a disk shape and having a predetermined thickness is provided on the inner side of the positioning sleeve body 28 and outside the holding plate 34 in the axial direction. As shown in FIG. 4, a shaft storing portion 46 for storing one end of the shaft 22 is formed at the center of the face of the rotor 44 opposite to the holding plate 34. A predetermined small clearance is formed between the shaft 22 and the shaft storing portion 46 and the shaft 22 can be freely rotated with respect to the rotor 44 in the normal state. In the normal state, the rotation of the rotor 44 is prevented by an unillustrated stopper.

As shown in FIG. 3, roller storing portions 48 are formed in the rotor 44 by enlarging portions of the diameter of the shaft storing portion 46. The rollers 32 are stored in these roller storing portions 48. Engaging projections 50 are formed on an inner side of the roller storing portions 48 in their diametrical direction and project in the circumferential direction. Each roller 32 stored in the roller storing portion 48 is engaged with the engaging projection 50 so that the roller 32 is held within the roller storing portion 48 and does not move toward the inner side in the diametrical direction.

The clutch mechanism 74 in accordance with the first embodiment of the present invention is constructed from the rollers 32 as transmitting members and the rotor 44 as a driving member having the engaging projections 50 (holding means) and tapers 52 (moving means).

The tapers 52 gradually approach the shaft 22 along the circumferential direction from the roller storing portion 48. When the rotor 44 is relatively rotated in the clockwise direction (the direction of arrow A) in FIG. 3 with respect to the casing 30, the rollers 32 do not revolve round the casing 30 since the rollers 32 are stored in the fixing storing portion 30B of the casing 30. Therefore, the engaging projections 50 of the rotor 44 and the rollers 32 are separated from each other and the engagement of the rollers 32 is released so that the rollers 32 can be moved toward the inner side in the diametrical direction.

As shown in FIG. 5, when the rotor 44 is further rotated in the direction of the arrow A with respect to the casing 30, each roller 32 is pushed by the taper 52 and begins to move to the inner side in the diametrical direction. As shown in FIG. 7, when the rotating angle of the rotor 44 with respect to the casing 30 reaches a predetermined angle, each roller 32 is nipped between the outer circumferential face of the shaft 22 and the taper 52. Thus, the rotor 44 and the shaft 22 are connected to each other through the rollers 32 and the rotating force of the rotor 44 is transmitted to the shaft 22.

As shown in FIG. 1, a shaft portion 54 having a cylindrical shape projects from the center of a face of the rotor 44 on the side opposite to the holding plate 34. A gear body 56 is mounted on the shaft portion 54. The rotor 44 and the gear body 56 are integrally rotated. A pinion 58 is concentrically formed in the gear body 56 with respect to the shaft portion 54.

Figure 9:
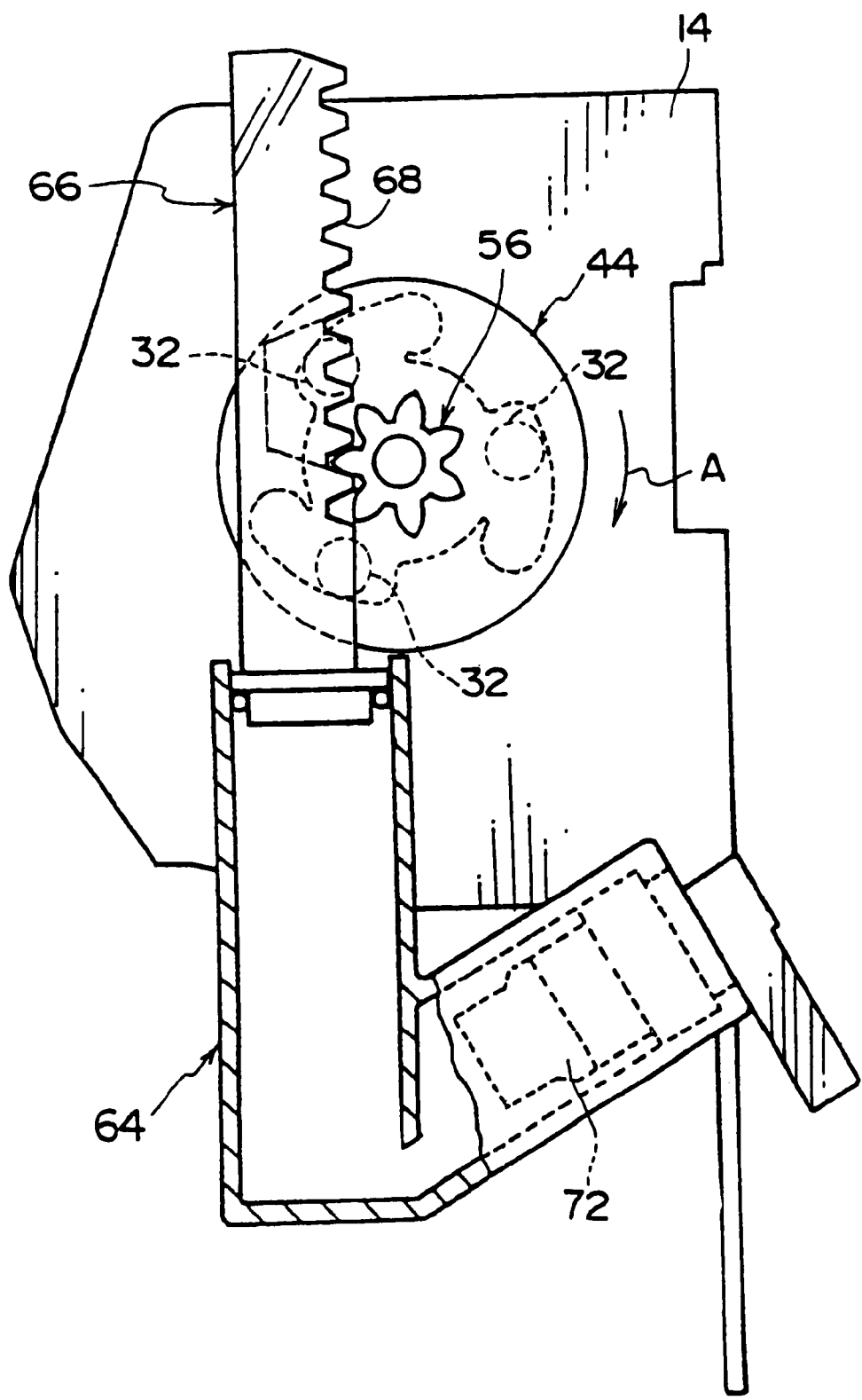
FIG. 9 is a side view showing a schematic construction of the webbing winding device in accordance with the first embodiment of the present invention in a state in which the webbing winding device performs a pretensioning operation.

As shown in FIGS. 2 and 9, a base cartridge 64 for holding a rack body 66 is formed in the frame 12. The rack body 66 can be moved in the longitudinal direction thereof (in the vertical direction in each of FIGS. 1, 2 and 9). When the rack body 66 is moved upward, a rack 68 formed in the rack body 66 is engaged with the pinion 58 of the gear body 56 and rotates the pinion 58 in the direction in which the webbing is wound up (the direction of the arrow A).

A gas generator 72 is arranged in the base cartridge 64. When an unillustrated sensor detects that deceleration of a predetermined value or more is applied to the vehicle having the webbing winding device 10 attached thereto, the gas generator 72 is operated and the rack body 66 is moved upward.

The operation and action of the webbing winding device 10 in this embodiment will next be explained.

In the normal state, i.e., when the deceleration of the vehicle having the webbing winding device 10 attached thereto is smaller than the predetermined value, the gas generator 72 is not operated, as shown in FIG. 2, so that the rotor 44 is not rotated. As shown in FIGS. 3 and 4, the rollers 32 are stored in the fixing storing portions 30B of the casing 30 and are held in the holding holes 42 of the holding plate 34, and are further engaged with the engaging projections 50. Accordingly, the rollers 32 are not nipped between the rotor 44 and the shaft 22. Therefore, the shaft 22 can be freely rotated with respect to the rotor 44. The winding sleeve body 20 is also freely rotated and the webbing 24 (see FIG. 1) can be pulled out and wound up.

When the unillustrated sensor detects that deceleration of a predetermined value or more is applied to the vehicle, the gas generator 72 is operated and the rack body 66 is moved in the upward direction shown in FIG. 2. As shown in FIG. 5, the prevention of the rotation of the rotor 44 using an unillustrated stopper is released by rotating the gear body 56 so that the rotor 44 is rotated in the webbing winding direction (the direction of the arrow A). However, the roller 32 is held in the fixing storing portion 30B of the casing 30 and the holding hole 42 of the holding plate 34. When the rotor 44 is rotated with large rotational acceleration, the roller 32 tends to stay within the holding hole 42 due to inertia. Accordingly, the rollers 32 do not revolve round the central axis J together with the rotor 44. Therefore, the engaging projections 50 are separated from the rollers 32 and the engagement of the rollers 32 is released so that the rollers 32 can be moved toward the inner side in the diametrical direction.

Figure 8:
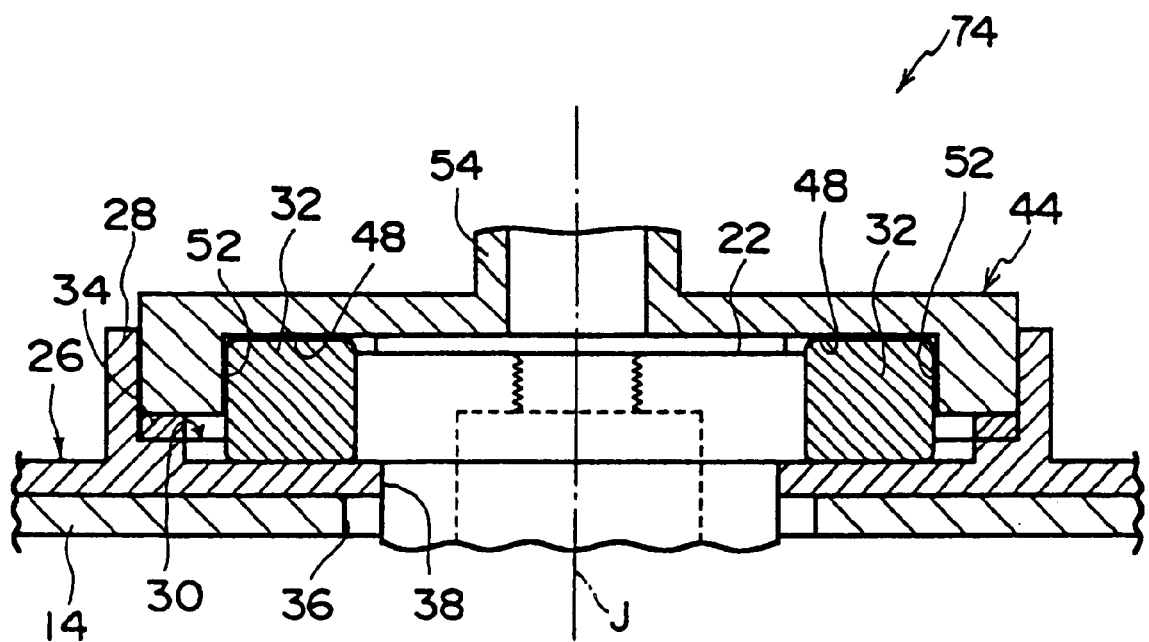
FIG. 8 is a cross-sectional view taken along line VIII—VIII of FIG. 7 and showing a state in which the roller is nipped between the rotor and the shaft in the clutch mechanism of the webbing winding device in accordance with the first embodiment of the present invention.

As shown in FIG. 7, when the rotor 44 is further rotated, each roller 32 is pushed by the taper 52 of the rotor 44 and is moved toward the inner side in the diametrical direction, i.e., toward the shaft 22. When the angle of rotation of the rotor 44 reaches a predetermined angle, the roller 32 is nipped between the outer circumferential face of the shaft 22 and the taper 52. Therefore, the rotor 44 and the shaft 22 are connected to each other via the rollers 32 so that rotating force of the rotor 44 can be transmitted to the shaft 22. At this time, as shown in FIGS. 7 and 8, the rollers 32 can be revolved round the central line J since the rollers 32 are stored in the moving storing portion 30A of the casing 30. When the rotor 44 is further rotated, the rotating torque of the rotor 44 is transmitted to the shaft 22 through the rollers 32 so that the rotor 44, the rollers 32, the shaft 22 and the winding sleeve body 20 are integrally rotated in the webbing winding direction (the direction of the arrow A). Accordingly, a so-called pretensioner is operated and the webbing 24 (see FIG. 1) begins to be wound around the winding sleeve body 20.

As shown in FIG. 9, in a state in which the rack body 66 is sufficiently moved upward, the winding sleeve body 20 is also sufficiently rotated in the webbing winding direction (the direction of the arrow A) and the webbing 24 is sufficiently wound around the winding sleeve body 20.

Thus, in the webbing winding device 10 employing the clutch mechanism 74 in accordance with the first embodiment, the roller 32 can be moved in advance between a transmitting position (a position shown in FIGS. 3 and 4) capable of transmitting the rotation force of the rotor 44 to the shaft 22 and a nontransmitting position (a position shown in FIGS. 7 and 8) in which no rotation force of the rotor 44 is transmitted to the shaft 22 by separating the rotor 44 from the shaft 22. In the normal state, the rollers 32 are held in the nontransmitting position by the fixing storing portions 30B and the engaging projections 50. When the rotor 44 is rotated in a sudden deceleration of the vehicle, the engagement of the rollers 32 with the engaging projections 50 is released and the rollers 32 can be moved to the transmitting position. Unlike the prior art, the rollers 32, a portion of a member for holding the rollers 32, or the like are not broken so that the rotation force of the rotor 44 can be transmitted to the shaft 22 without causing resistance in the rotation of the rotor 44 or wasting the rotation force of the rotor 44.

Figure 10:
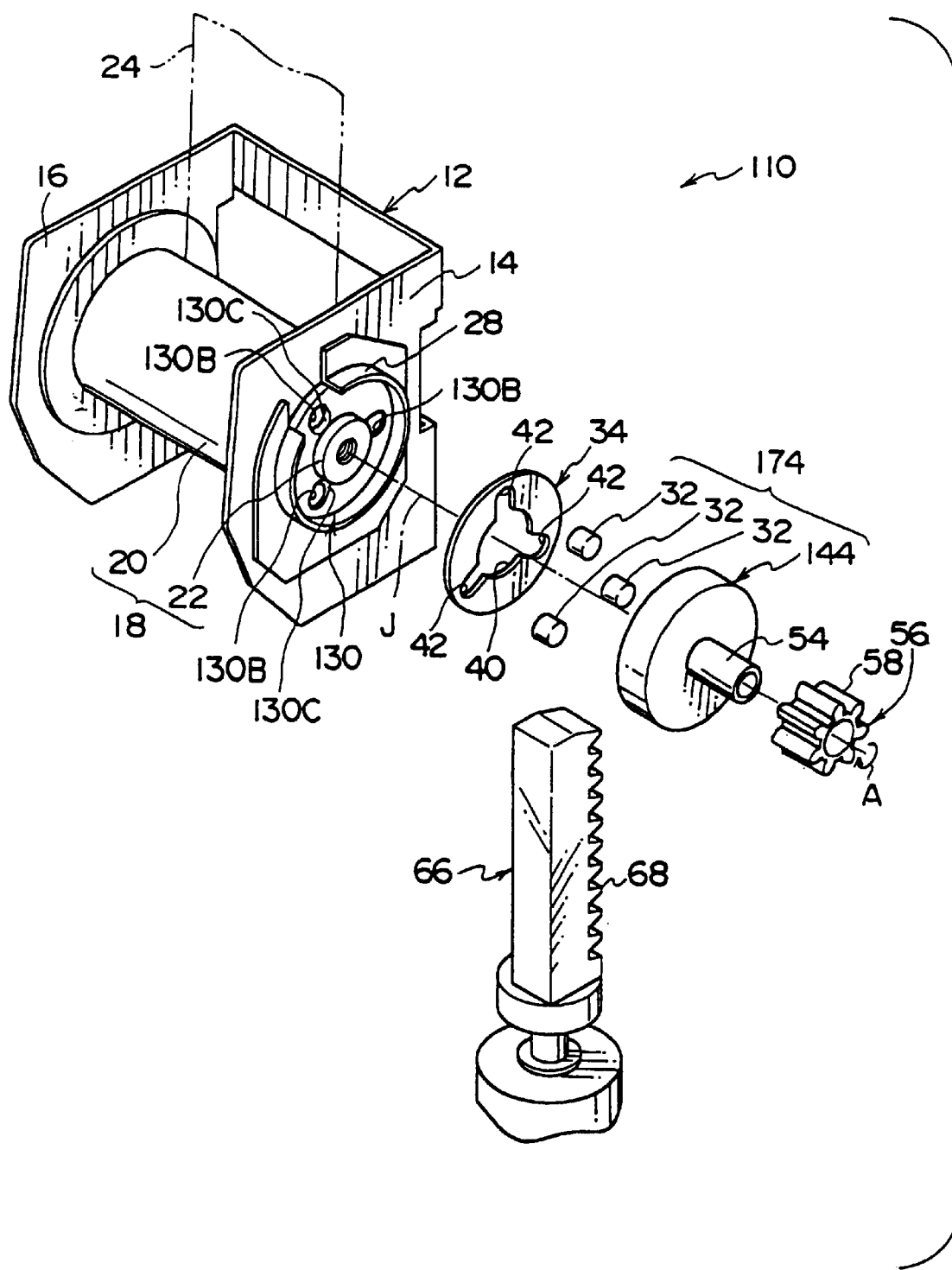
FIG. 10 is an exploded perspective view showing a webbing winding device in accordance with a second embodiment of the present invention.

FIG. 10 shows a webbing winding device 110 employing a clutch mechanism 174 in accordance with a second embodiment of the present invention. FIGS. 11 to 16 show an operation of the clutch mechanism 174.

In this webbing winding device 110, the shapes of a casing 130 and a rotor 144 are different in comparison with the webbing winding device 10 in accordance with the first embodiment. In the following description, the same members, elements, etc. as the webbing winding device 10 in accordance with the first embodiment are designated by the same reference numerals and their explanations are omitted here.

In the casing 130 of this webbing winding device 110, fixing storing portions 130B are formed in the same position as the fixing storing portions 30B of the casing 30 in accordance with the first embodiment. Rollers 32 are stored in the fixing storing portions 130B.

Figure 12:
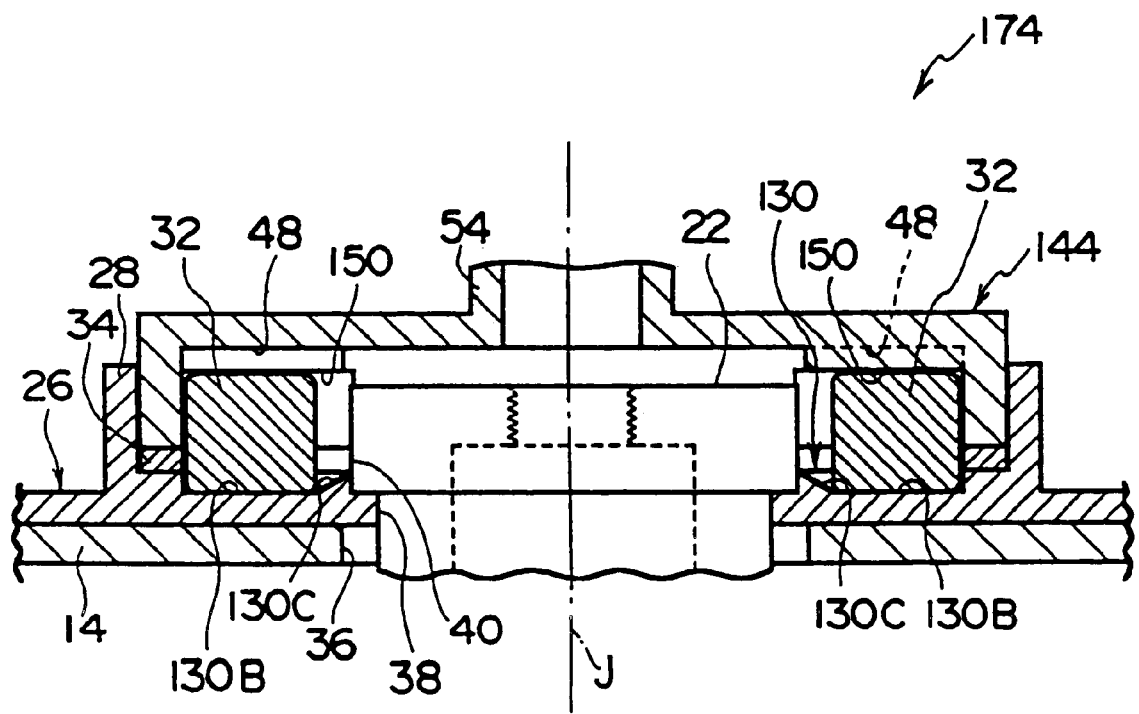
FIG. 12 is a cross-sectional view taken along line XII—XII of FIG. 3 and showing the clutch mechanism of the webbing winding device in accordance with the second embodiment of the present invention.

No moving storing portion 30A of the casing 30 in accordance with the first embodiment is formed in the casing 130, instead, as is shown in FIG. 12, inclined faces 130C are formed instead of the moving storing portions 30A. The inclined faces 130C incline upwards in the direction approaching the rotor 144 (in the upward direction in FIG. 12) as the inclined faces 130C is in the direction going from the fixing storing portions 130B toward an insertion hole 38. When each roller 32 is pushed by the taper 52 of the rotor 144 to move towards the inner side in the diametrical direction, the roller 32 is moved along the inclined face 130C in a direction (the upward direction in FIG. 12) away from the fixing storing portion 130B. When the roller 32 is nipped between the taper 52 and the shaft 22, the roller 32 is set to be perfectly pulled out of the fixing storing portion 130B as shown in FIG. 16. Accordingly, in this state, the roller 32 is not fixed to the fixing storing portion 130B and can be revolved round a central axis J with respect to the casing 130.

Figure 11:
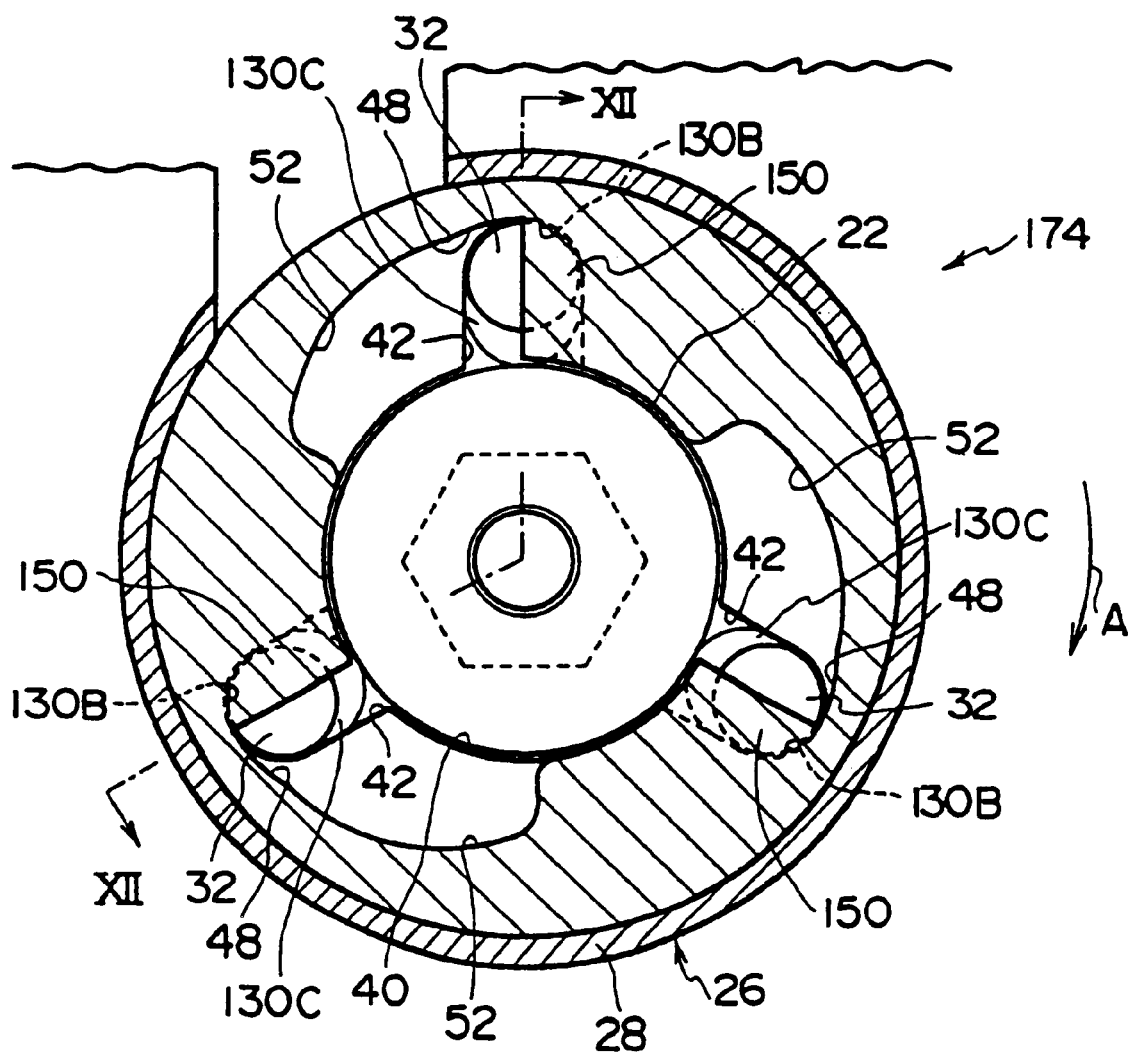
FIG. 11 is a cross-sectional view showing a clutch mechanism of the webbing winding device in accordance with the second embodiment of the present invention.
Figure 13:
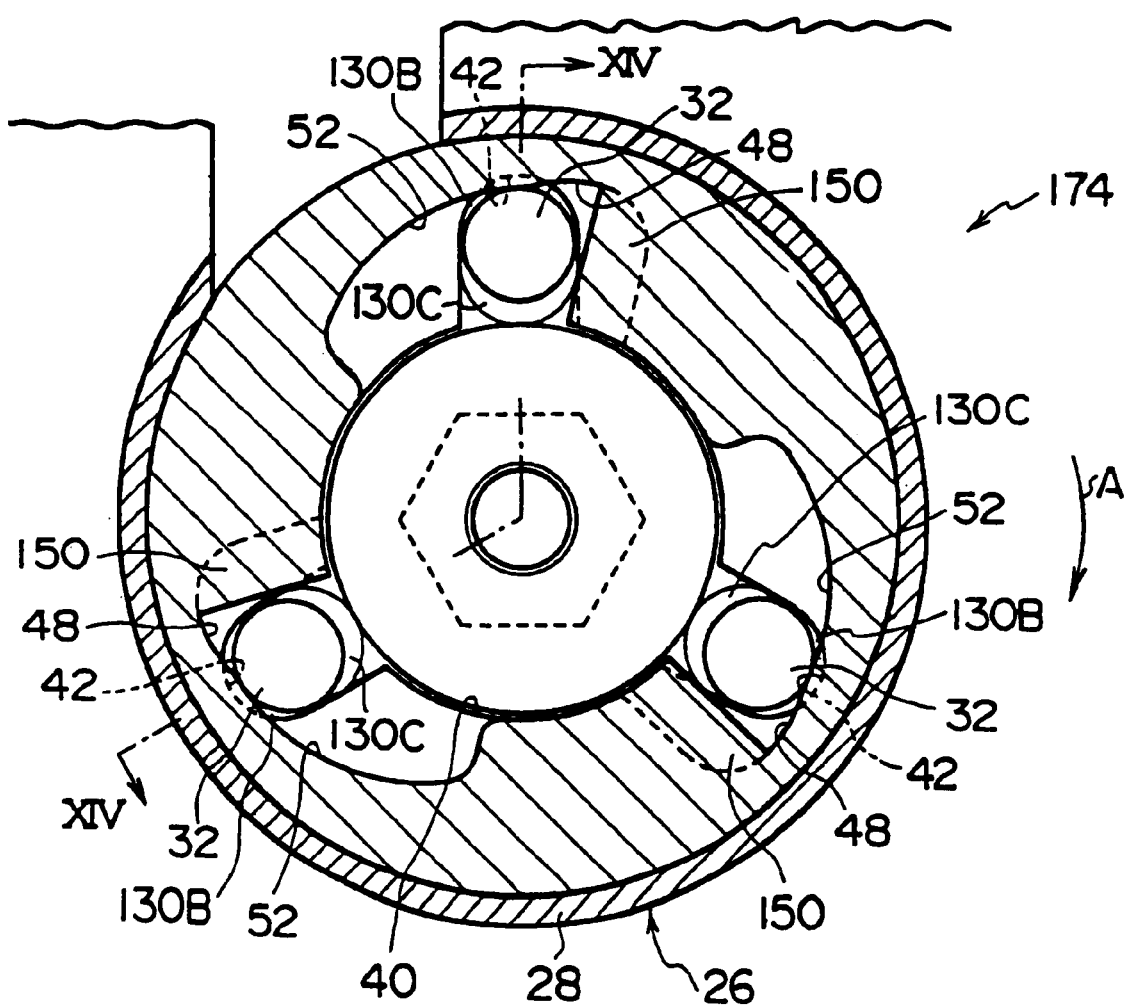
FIG. 13 is a cross-sectional view showing a state in which the engagement of a roller is released in the clutch mechanism of the webbing winding device in accordance with the second embodiment of the present invention.
Figure 14:
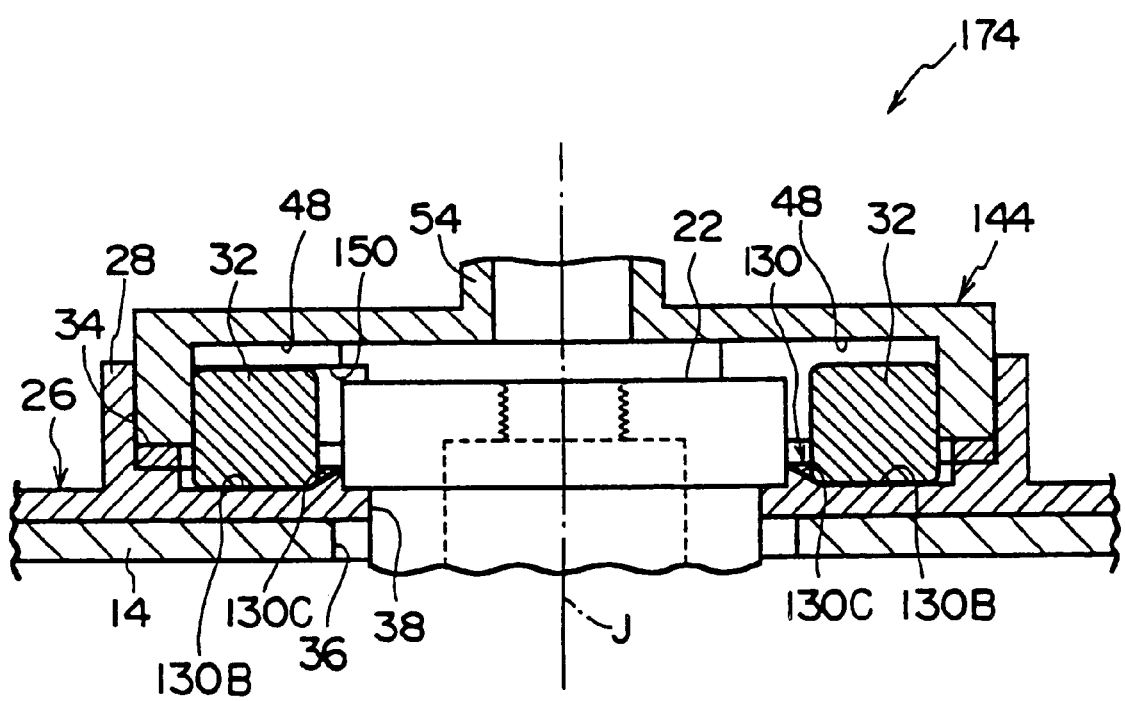
FIG. 14 is a cross-sectional view taken along line XIV—XIV of FIG. 13 and showing a state in which the engagement of the roller is released in the clutch mechanism of the webbing winding device in accordance with the second embodiment of the present invention.

As shown in FIGS. 11 and 12, no engaging projection 50 of the rotor 44 in the first embodiment is formed in the rotor 144. A nipping step portion 150 is formed instead of an engaging projection 50 by partially lowering the height (the distance between the roller storing portion 48 and the fixing storing portion 130B of the casing 130) of a roller storing portion 48 of the rotor 144. In the normal state, each roller 32 is fixedly nipped in an axial direction between this nipping step portion 150 and the fixing storing portion 130B of the casing 130. When the rotor 144 is rotated in a webbing winding direction with respect to the casing 130 and the roller 32, the nipping step portion 150 is separated from the roller 32 as shown in FIGS. 13 and 14 so that a clearance is formed between an upper face of the roller 32 and the roller storing portion 48. Therefore, the nipping of the roller 32 is released and the roller 32 can be moved in the axial direction and can be also moved in the diametrical direction.

The clutch mechanism 174 in accordance with the second embodiment of the present invention is constructed from rollers 32 as transmitting members and the rotor 144 as a driving member having nipping step portions 150 (holding means) and tapers 52 (moving means).

Similar to the webbing winding device 10 in accordance with the first embodiment, each roller 32 is also nipped between a nipping step portion 150 and a fixing storing portion 130B in the normal state in this webbing winding device 110, and is not nipped between the rotor 144 and the shaft 22. Accordingly, the shaft 22 can be freely rotated with respect to the rotor 144 and a winding sleeve body 20 is also freely rotated and a webbing 24 (see FIG. 10) can be pulled out and wound up.

When an unillustrated sensor detects that deceleration of a predetermined value or more is applied to a vehicle and the rotor 144 is rotated in the webbing winding direction (the direction of an arrow A) by the upward movement of a rack body 66, the nipping step portion 150 is separated from the roller 32, as shown in FIGS. 13 and 14, and the nipping of the rollers 32 is released so that the rollers 32 can be moved toward the diametrical inner side in the axial direction.

Figure 15:
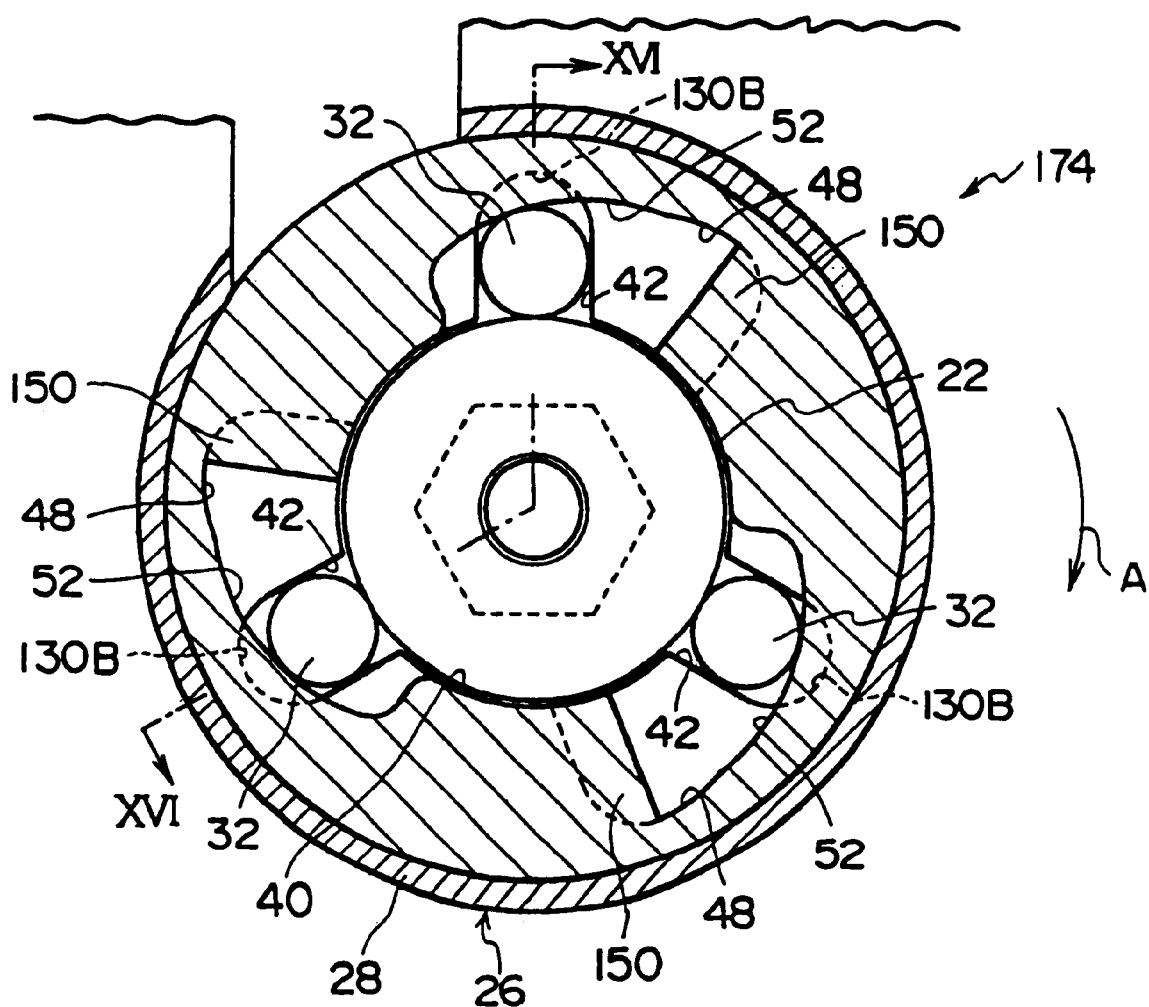
FIG. 15 is a cross-sectional view showing a state in which the roller is nipped between a rotor and a shaft in the clutch mechanism of the webbing winding device in accordance with the second embodiment of the present invention.
Figure 17:
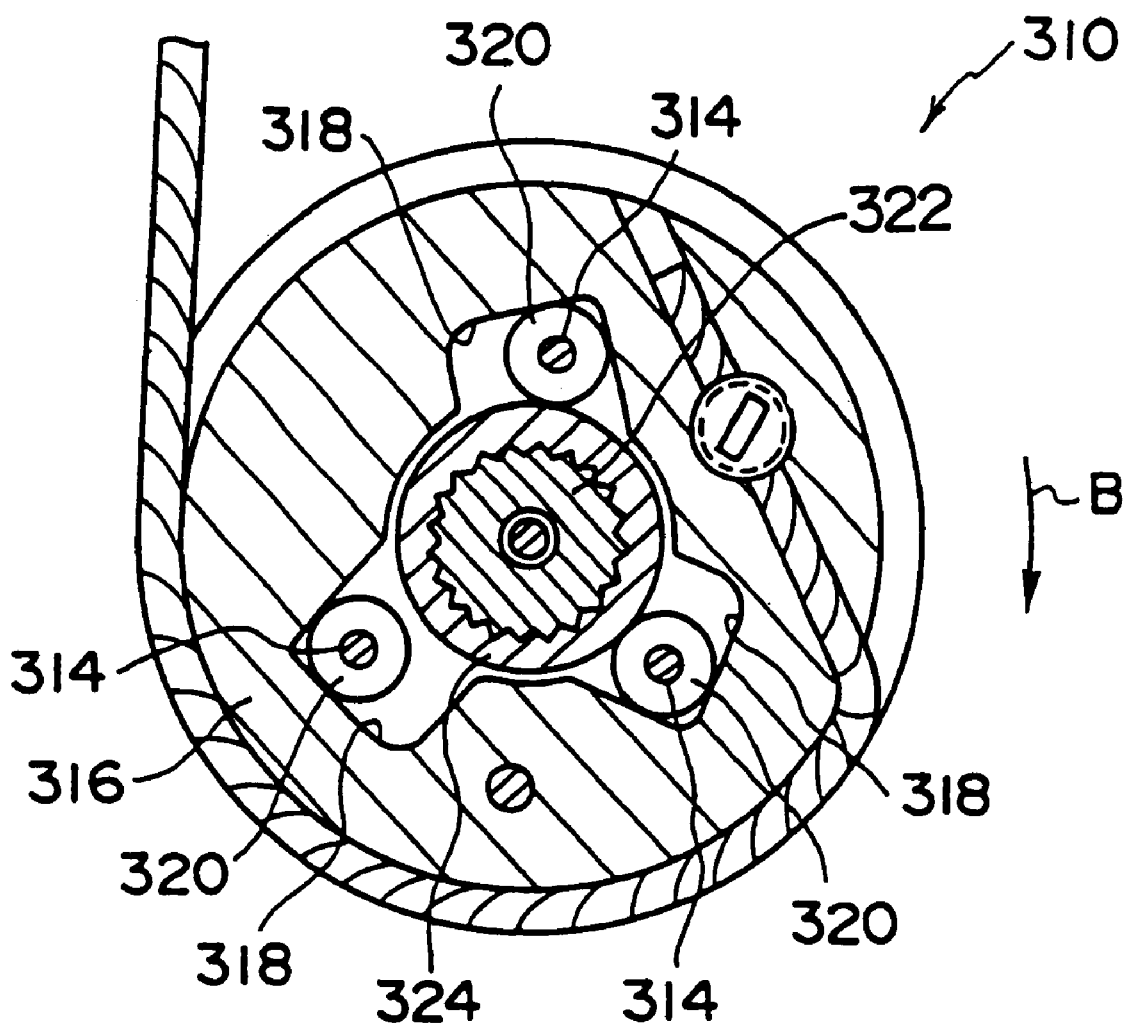
FIG. 17 is a side view showing a conventional webbing winding device.
Figure 18:
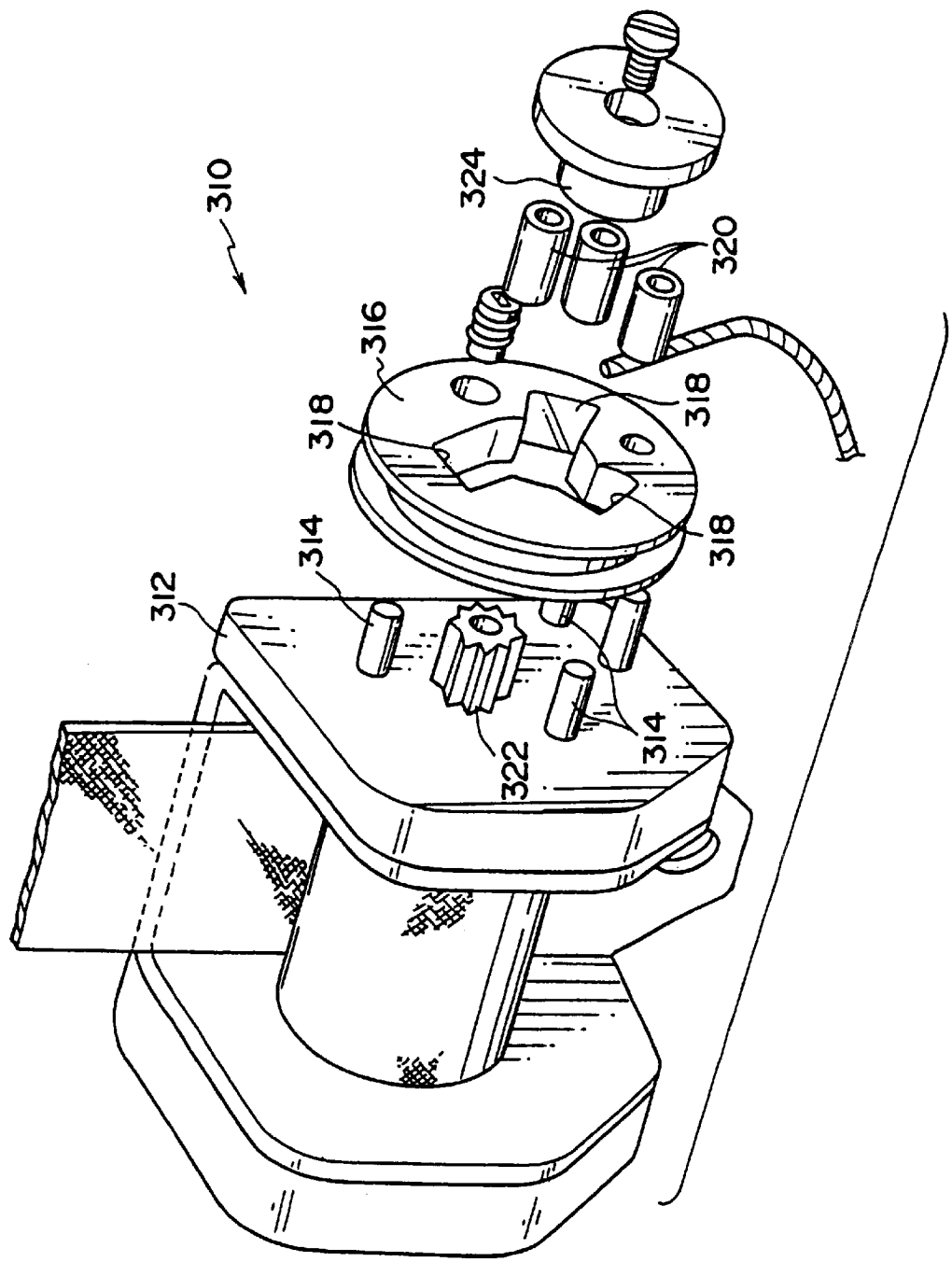
FIG. 18 is an exploded perspective view showing the conventional webbing winding device.
Figure 19:
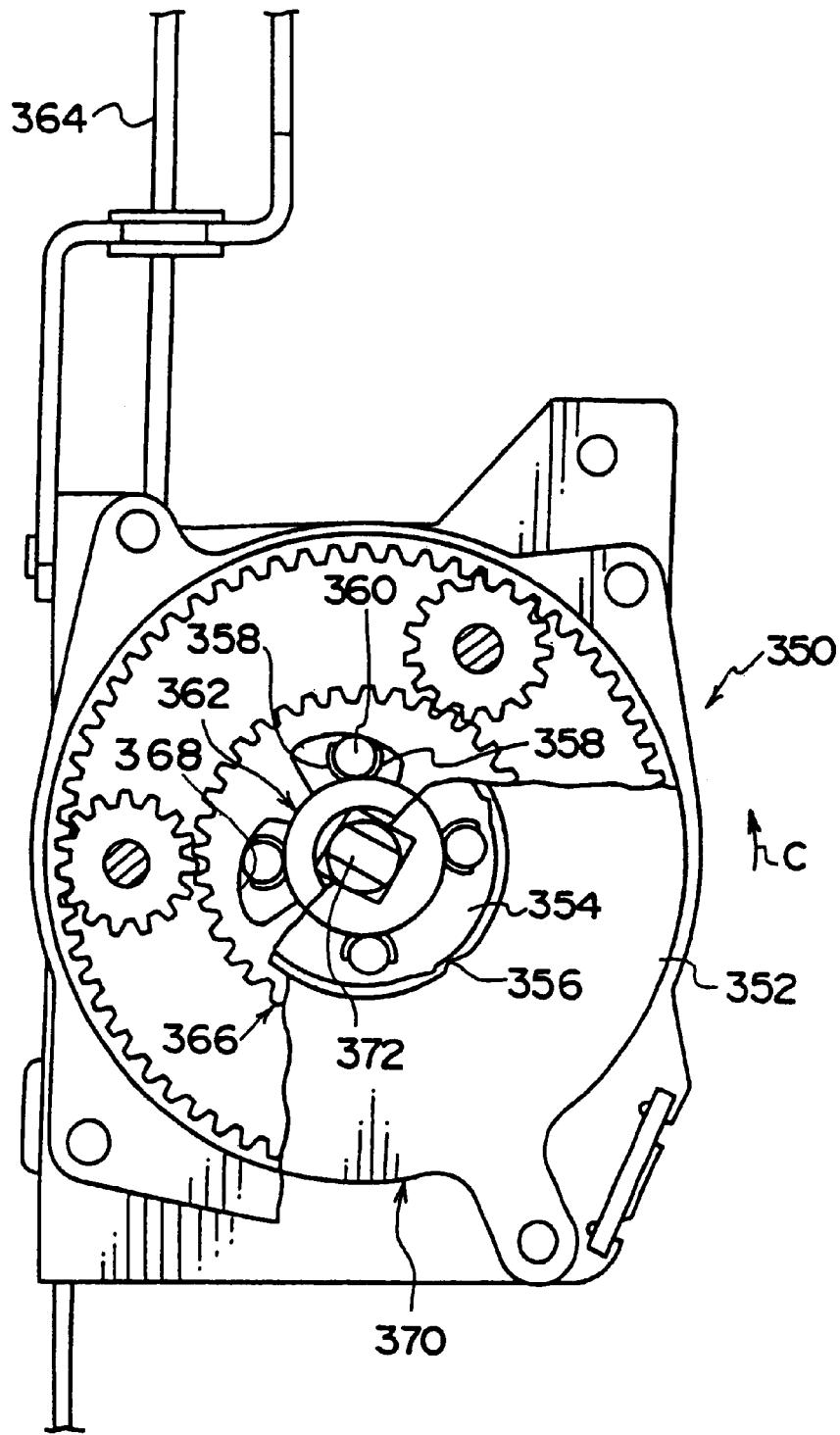
FIG. 19 is a cross-sectional view showing a main portion of a conventional webbing winding device.

As shown in FIGS. 15 and 16, when the rotor 44 is further rotated, each roller 32 is pushed by a taper 52 of the rotor 144 and is moved toward the inner side in the diametrical direction, i.e., toward the shaft 22. The roller 32 is simultaneously moved along the inclined face 130C in a direction (in the upward direction in FIG. 16) in which the roller 32 is pulled out of the fixing storing portion 30B.

When the angle of rotation of the rotor 144 reaches a predetermined angle, each roller 32 is nipped between an outer circumferential face of the shaft 22 and a taper 52 so that the rotor 144 and the shaft 22 are connected to each other via the roller 32. At this time, since the roller 32 is perfectly pulled out of the fixing storing portion 130B of the casing 30, the roller 32 can be revolved round a central line J. When the rotor 44 is further rotated, the rotation torque of the rotor 144 is transmitted to the shaft 22 via the roller 32 so that the rotor 144, the roller 32, the shaft 22 and the winding sleeve body 20 are integrally rotated in the webbing winding direction and the webbing 24 (see FIG. 10) is wound around the winding sleeve body 20.

Thus, each roller 32 is also moved to a transmitting position (a position shown in FIG. 15) capable of transmitting the rotation force of the rotor 144 to the shaft 22 without breaking the roller 32, a portion of a member for holding the roller 32, or the like in the webbing winding device 110 in accordance with the second embodiment. Accordingly, the rotation force of the rotor 144 can be transmitted to the shaft 22 without causing resistance in the rotation of the rotor 144 or wasting the rotation force of the rotor 144.

In each of the above embodiments, the clutch mechanisms 74 and 174 in the present invention are respectively employed as examples in the webbing winding devices 10 and 110. However, devices capable of employing the clutch mechanisms 74 or 174 are not limited to the webbing winding device. In short, the clutch mechanism in the present invention can be applied to the construction of a device in which a member to be rotated can be freely rotated with respect to a rotating member in the normal state, and the rotation force of the rotating member can be transmitted to the member to be rotated only when the rotating member is rotated.

The holding means for holding the roller 32 as a transmitting member in the nontransmitting position (a position shown in FIG. 3 in the first embodiment and a position shown in FIG. 11 in the second embodiment) is not limited to the above engaging projection 50 and the above nipping step portion 150, etc. In short, it is sufficient to hold the transmitting member (the roller 32) in the nontransmitting position (a position spaced apart from at least one of the rotor 44 or 144 and the shaft 22) when no rotating member is rotated (when each of the rotors 44, 144 is not rotated in the webbing winding direction). For example, the rollers 32 may be held in the nontransmitting position by projecting from the shaft 22 a projection performing an operation similar to that of the engaging projection 50. Further, similar to the nipping step portion 150, a step portion for nipping a rollers 32 may be formed in the shaft 22. Furthermore, the moving means for moving the rollers 32 from the nontransmitting position to the transmitting position is not limited to the above taper 52. For example, a taper may be formed on an outer circumferential face of the shaft 22.

When the rollers 32 are held in a position of the holding hole 42 by inertia from rotating each of the rotors 44 and 144 at a large angle of rotation velocity, the roller 32 are pushed by the tapers 52 of the rotors 44 and 144 and can be nipped between the outer circumferential face of the shaft 22 and the tapers 52 without forming the holding hole 42.

What is claimed is:

1. A clutch mechanism comprising:

a rotating member capable of transmitting rotation force to a member to be rotated;

a supporting member for rotatably supporting said member to be rotated;

a transmitting member nipped between said member to be rotated and said rotating member and able to be moved between a transmitting position for transmitting the rotation force of said rotating member to the member to be rotated and a nontransmitting position spaced apart from said member to be rotated;

holding means for holding said transmitting member in said nontransmitting position in a state in which said rotating member is not rotated with respect to said supporting member; and moving means for moving said transmitting member to said transmitting position when said rotating member is rotated with respect to said supporting member in a state in which the holding of said transmitting member using said holding means in said nontransmitting position is released, wherein said holding means is constructed at least in part from a storing portion means in said supporting member for receiving said transmitting member and said transmitting member is held in the nontransmitting position by setting said transmitting member so as to be unable to be moved in one of a diametrical direction, axial direction, or combination of diametrical and axial directions of said rotating member.

2. A clutch mechanism according to claim 1, wherein said holding means is constructed from a combination of said rotating member and said supporting member, and said transmitting member is held in the nontransmitting position by setting said transmitting member so as to be unable to be moved in a diametrical direction of said rotating member.

3. A clutch mechanism according to claim 1, wherein said holding means is constructed from a combination of said rotating member and said supporting member, and said transmitting member is held in the nontransmitting position by setting said transmitting member so as to be unable to be moved in an axial direction of said rotating member.

4. A clutch mechanism according to claim 1, wherein said holding means is constructed from a combination of said rotating member and said supporting member, and said transmitting member is held in the nontransmitting position by setting said transmitting member so as to be unable to be moved in diametrical and axial directions of said rotating member.

5. A clutch mechanism comprising:

a rotating member capable of transmitting rotation force to a member to be rotated;

a casing for rotatably supporting said member to be rotated;

a transmitting member nipped between said member to be rotated and said rotating member and able to be moved between a transmitting position for transmitting the rotation force of said rotating member to the member to be rotated and a nontransmitting position spaced apart from said member to be rotated;

holding means for holding said transmitting member in said nontransmitting position in a state in which said rotating member is not rotated with respect to said casing; and moving means for moving said transmitting member to said transmitting position when said rotating member is rotated with respect to said casing in a state in which the holding of said transmitting member using said holding means in said nontransmitting position is released, wherein said holding means is constructed at least in part from a storing portion means in said casing for receiving said transmitting member and said transmitting member is held in the nontransmitting position by setting said transmitting member so as to be unable to be moved in one of a diametrical direction, axial direction, or combination of said diametrical and axial directions of said rotating member.

6. A clutch mechanism according to claim 5, wherein said holding means is constructed from a combination of said rotating member and said casing, and said transmitting member is held in the nontransmitting position by setting said transmitting member so as to be unable to be moved in a diametrical direction of said rotating member.

7. A clutch mechanism according to claim 5, wherein said holding means is constructed from a combination of said rotating member and said casing, and said transmitting member is held in the nontransmitting position by setting said transmitting member so as to be unable to be moved in diametrical and axial directions of said rotating member.

8. A webbing winding device comprising:

a spool for a webbing to be wound around so as to allow said webbing to be pulled from said spool;

a pretensioner having a rotating member capable of transmitting rotation force in a webbing winding direction to said spool when a vehicle suddenly decelerates;

a casing for rotatably supporting said spool;

a roller nipped between said spool and said rotating member and able to be moved between a transmitting position for transmitting rotation force from said rotating member to said spool and a nontransmitting position spaced apart from at least one of said spool and said rotating member;

a holding portion for holding said roller in said nontransmitting position in a state in which said rotating member is not rotated with respect to said casing; and a moving portion for moving said roller to said transmitting position when said rotating member is rotated with respect to said casing in a state in which the holding of said roller using said holding portion in said nontransmitting position is released, wherein said holding portion is constructed from said rotating member and a recess in said casing and said roller is held in the nontransmitting position by setting said roller so as to be unable to be moved in one of a diametrical direction, axial direction, or combination of diametrical and axial directions of said rotating member.

9. The webbing winding device according to claim 9, wherein said holding portion is shaped as a projection.

10. The webbing winding device according to claim 9, wherein said holding portion has a stepped shape.

* * * * *